United States Patent Office 3,551,287
Patented Dec. 29, 1970

3,551,287
TOTALLY INORGANIC PAPERS AND MEMBRANES SUITABLE FOR ION EXCHANGE MADE OF CERIUM (IV) PHOSPHATE AND PROCESS FOR PREPARING THE SAME
Giulio Alberti and Umberto Costantino, Rome, Italy, assignors to Comitato Nazionale per l'Energia Nucleare, Rome, Italy
No Drawing. Filed May 13, 1968, Ser. No. 728,775
Claims priority, application Italy, May 13, 1967, 36,739/67
Int. Cl. D21h 5/12
U.S. Cl. 162—157                                8 Claims

ABSTRACT OF THE DISCLOSURE

Inorganic layers, papers and membranes for ion exchange are made of non amorphous tetravalent cerium phosphate with a ratio $PO_4/Ce$ in the solid ranging from 1.7 to 2.

---

This invention relates to a process for preparing papers and membranes suitable for ion exchange which are totally inorganic and are made of cerium (IV) phosphate. Up to now, only organic papers and membranes for ion exchange have been prepared which are used in the various fields of technology. However because they are made of organic matter, their resistance to various physical-chemical agents, such as temperature, the ionizing radiation, the oxidizing agents etc. is small.

It is well known that the inorganic substances are more resistant than the organic ones toward said agents.

It is therefore a main object of this invention to provide a method for preparing papers and membranes suitable for ion exchange which are totally inorganic and as a consequence more resistant than the organic ones against the above mentioned agents. Other objects and advantages of the papers and membranes of this invention will become apparent from the following description.

In a preceding patent application in Italy (Appl. No. 36708A/67 dated May 12, 1967) a process has been disclosed for preparing non-amorphous cerium (IV) phosphate. As disclosed in said application, a crystalline cerium (IV) phosphate with a ratio $PO_4/Ce$ in the solid ranging from 1.7 to 2 may be obtained in suitable process conditions.

Since the crystalline forms of cerium (IV) with a ratio $PO_4/Ce$ ranging from 1.7 to 2 have a fibrous structure suitable for preparing papers and membranes, it is the main object of this invention to employ such crystalline forms for preparing inorganic papers and membranes for ion exchange.

This invention consists in exploiting the characteristics of the fibrous cerium (IV) phosphate to the aim of obtaining said inorganic papers and membranes for ion exchange of various consistency and thickness depending on the user's requirements. A typical process for producing papers made of cerium (IV) phosphate is as follows:

The crystalline cerium (IV) phosphate with a ratio $PO_4/Ce$ ranging from 1.7 to 2 is prepared by one of the processes described in the above mentioned application.

After precipitating, digesting and washing of the cerium phosphate, the material so obtained is suspended in water or in a weakly acid solution such as a diluted solution of phosphoric acid and the suspension is slowly filtered on a flat filter e.g. a paper or porous plastic filter suitably supported; subsequent to filtering, the filter with the precipitate stratified thereon is dried in air or in a drying device; the cerium (IV) phosphate is then separated from the filter in the form of a solid flexible layer; its appearance is very similar to the usual cellulose paper and its thickness depends both on the quantity of fibrous cerium phosphate and on the useful surface of the filter. If it is desired to increase the consistency of the inorganic paper obtained by said process, the filtering may be carried out under pressure, under vacuum or in a centrifuge.

With the above process, depending on the quantity of material used, both very thick layers may be obtained and thin layers less than 0.1 millimeter thick. The above example is given as an illustrative non-limiting example, inasmuch as said layers may be obtained also with all the usual techniques for preparing cellulosic papers and membranes such as calendering, pressing, vibration filtering, etc., whereby organic and inorganic additives or bindings may be added.

The papers obtained by one of the above described processes have a certain degree of porosity and for this reason they can suck liquids (aqueous solutions or others) due to the capillarity. This feature makes these papers usable in ascending or descending chromatographs and in the zonal electrophoresis. The ion exchange properties of the crystalline products used for preparing such papers make them also suitable for use with various processes of chromatographic separation through ion exchange. Such papers furthermore are sufficiently flexible and resistant both to temperatures lower than 200° C. and to the concentrated perchloric acid.

For the purpose of adapting the papers of this invention to meet the different requirements of chromatography and electrophoresis, the capillarity properties of the papers may be modified by mixing a suitable additive such as for instance a paste of chromatographic paper with the cerium phosphate thereby obtaining a mixed paper cerium phosphate plus additive.

With the cerium phosphate having fibrous structure, inorganic membranes for ion exchange may also be prepared which therefore are an object of this invention. For this purpose several usual processes may be employed suitable for preparing membranes such as: (a) obtaining by filtration, as previously mentioned, very thick layers; subsequently reducing the thickness through calendering or pressing; (b) adding various additives, such as a plastic substance to the fibrous cerium phosphate for reducing the porosity thereof; (c) successive filtration of small portions of a precipitate finely dispersed until solid layers are obtained which do not allow liquids to pass through not even under vacuum.

For such membranes a number of practical applications and uses can be foreseen.

Among these applications there is the use of the membranes of this invention in the processes for removing salt from salted waters by means of electrodialysis and by inverted osmosis.

It is also pointed out that since the hydrogen of the cerium phosphate is readily exchangeable with other inorganic cations, the inorganic papers and membranes for ion exchange which are the object of this invention may be also prepared in various saline forms.

What we claim is:

1. Inorganic papers for ion exchange characterized by the fact of being made of non amorphous tetravalent cerium phosphate with a ratio $PO_4/Ce$ in the solid ranging from 1.7 to 2.

2. Inorganic membranes for ion exchange characterized by the fact of being made of non amorphous tetravalent cerium phosphate with a ratio $PO_4/Ce$ in the solid ranging from 1.7 to 2.

3. Inorganic layers or beds for ion exchange characterized by the fact of being made of non amorphous tetravalent cerium phosphate with a ratio $PO_4/Ce$ in the solid ranging from 1.7 to 2.

4. A process for preparing papers as per claim 1 characterized by the fact that a precipitate of non amorphous cerium (IV) phosphate having the characteristics described in claim 1 is filtered on a flat filter and subsequently detached from the filter in the form of a flexible layer of which the appearance is similar to cellulose paper.

5. Process for preparing membranes as per claim 2, by pressing thick layers obtained as per claim 4.

6. A process for preparing the inorganic papers described in claim 1, which comprises making a suspension of non amorphous tetravalent cerium phosphate with a ratio $PO_4/Ce$ in the solid ranging from 1.7 to 2 and then feeding said suspension to a paper machine.

7. A process for preparing the membranes described in claim 2, which comprises making a suspension of non-amorphous cerium (IV) phosphate having the characteristics described in claim 2, mixing said suspension with a porosity reducing substance, filtering the mixture on a flat filter and producing a flexible layer of non-amorphous cerium phosphate.

8. A process in accordance with claim 7, wherein the porosity reducing substance is a plastic substance.

References Cited

UNITED STATES PATENTS

| | | | |
|---|---|---|---|
| 3,056,647 | 10/1962 | Amphlett | 23—139X |
| 3,328,117 | 6/1967 | Emslie et al. | 162—146X |
| 3,337,451 | 8/1967 | Calmon | 210—24 |
| 3,418,158 | 12/1968 | Perry et al. | 210—31 |
| 3,455,818 | 7/1969 | Leifield | 210—31 |

SAMIH N. ZAHARNA, Primary Examiner

U.S. Cl. X.R.

210—24, 489